United States Patent
Miklas

(10) Patent No.: US 8,474,772 B2
(45) Date of Patent: Jul. 2, 2013

(54) TELESCOPING CUP HOLDER

(75) Inventor: John L. Miklas, Clinton Township, MI (US)

(73) Assignee: Ford Global Technologies, LLC, Dearborn, MI (US)

(*) Notice: Subject to any disclaimer, the term of this patent is extended or adjusted under 35 U.S.C. 154(b) by 5 days.

(21) Appl. No.: 13/240,288

(22) Filed: Sep. 22, 2011

(65) Prior Publication Data

US 2013/0075562 A1    Mar. 28, 2013

(51) Int. Cl.
- *E04G 3/00* (2006.01)
- *A47F 5/00* (2006.01)
- *A47F 7/00* (2006.01)
- *A47K 1/08* (2006.01)
- *A47G 1/10* (2006.01)
- *B60R 7/00* (2006.01)

(52) U.S. Cl.
USPC ............. 248/286.1; 248/315; 248/223.31; 248/313; 248/314; 248/316.2; 248/316.3; 248/316.1; 224/281; 224/499; 220/8; 220/737

(58) Field of Classification Search
USPC ............. 248/286.1, 315, 223.31, 313, 314, 248/316.2, 316.3, 316.1; 224/281, 499; 220/8, 220/737
See application file for complete search history.

(56) References Cited

U.S. PATENT DOCUMENTS

| | | | |
|---|---|---|---|
| 5,289,962 A | 3/1994 | Tull et al. | |
| 5,692,718 A | 12/1997 | Bieck | |
| 5,862,932 A * | 1/1999 | Walsh et al. | 220/8 |
| 6,024,395 A | 2/2000 | Kang | |
| 7,036,785 B2 | 5/2006 | Moyer et al. | |
| 7,090,183 B2 * | 8/2006 | Heybl et al. | 248/314 |
| 7,300,031 B2 * | 11/2007 | Bertsch et al. | 248/311.2 |
| 7,757,888 B2 * | 7/2010 | Ogura | 220/737 |
| 8,042,780 B2 * | 10/2011 | Wagner et al. | 248/311.2 |
| 8,245,894 B2 * | 8/2012 | Buehler | 224/411 |
| 2003/0197104 A1 * | 10/2003 | Heybl et al. | 248/311.2 |
| 2005/0211714 A1 * | 9/2005 | Kazyaka | 220/737 |
| 2005/0224676 A1 | 10/2005 | Stavermann | |
| 2005/0269472 A1 * | 12/2005 | Wagner et al. | 248/311.2 |
| 2006/0081750 A1 * | 4/2006 | Kazyaka | 248/311.2 |
| 2006/0175507 A1 * | 8/2006 | Bertsch et al. | 248/311.2 |
| 2011/0248037 A1 * | 10/2011 | Fung | 220/592.2 |
| 2011/0259906 A1 * | 10/2011 | Shimajiri | 220/737 |
| 2011/0303659 A1 * | 12/2011 | Perlman | 220/8 |
| 2012/0248106 A1 * | 10/2012 | Marta | 220/8 |

FOREIGN PATENT DOCUMENTS

| | | |
|---|---|---|
| DE | 10060798 B4 | 12/2006 |
| JP | 2009-280005 A | 12/2009 |

\* cited by examiner

*Primary Examiner* — Terrell McKinnon
*Assistant Examiner* — Christopher Garft
(74) *Attorney, Agent, or Firm* — Vichit Chea

(57) ABSTRACT

A cup holder is deployed from a recess in a substantially vertical panel behind a substantially planar fold-down door which is pivotable adjacent to a bottom edge. A substantially planar tray member is slidably mounted to a guide frame to move between a collapsed position and an expanded position at respective distances from the inside surface of the fold-down door. A telescoping holder unit with substantially cylindrical sleeve elements slides from a collapsed state to an expanded state in response to movement of the tray member. A top rim of the holder unit is fixed with respect to a cylindrical sleeve element having a largest diameter and is coupled to the tray member. A bottom plate of the holder unit is coupled to the fold-down door. The holder unit accommodates various beverage containers.

8 Claims, 5 Drawing Sheets

US 8,474,772 B2

TELESCOPING CUP HOLDER

CROSS REFERENCE TO RELATED APPLICATIONS

Not Applicable.

STATEMENT REGARDING FEDERALLY SPONSORED RESEARCH

Not Applicable.

BACKGROUND OF THE INVENTION

The present invention relates in general to cup holders for vehicles and other environments, and, more specifically, to a stowable cup holder that can be concealed within a vertical panel.

An abundance of cup holders is desired by users of vehicles and other seating environments such as theaters and stadiums. In some locations such as the rear seats of a vehicle passenger compartment, the locations for placing a conventional cup holder have been very limited due to the absence of horizontal surfaces and the lack of depth behind the available vertical surfaces (such as the trim surface of a side door or the back surface of the front passenger seats or console). Many prior attempts to package cup holders in these locations have produced flimsy cup holders which lack structural integrity, are difficult to use, and are difficult to clean. It would be desirable to provide a cup holder that efficiently uses the limited packaging space available behind a vertical panel while solving the foregoing problems and accommodating both large and small beverage containers.

SUMMARY OF THE INVENTION

In one aspect of the invention, a cup holder is provided for deployment from a recess in a substantially vertical panel. A substantially planar fold-down door is pivotable along a pivot axis adjacent to a bottom edge of the fold-down door, wherein the fold-down door has a substantially vertical closed position covering the recess and a substantially horizontal open position. The fold-down door has an outside trim surface opposite from an inside surface. A guide frame extends from the inside surface of the fold-down door adjacent the bottom edge. A substantially planar tray member extends substantially parallel to the fold-down door and is slidably mounted to the guide frame to move between a collapsed position and an expanded position at respective distances from the inside surface of the fold-down door. The tray member has a central aperture. A telescoping holder unit comprises a plurality of substantially cylindrical sleeve elements having different diameters and concentrically arranged to slide from a collapsed state to an expanded state. The holder unit has a bottom plate and a top rim, wherein the top rim is fixed with respect to a cylindrical sleeve element having a largest diameter. The top rim is coupled to the tray member with the holder unit disposed within the central aperture. The bottom plate is coupled to the fold-down door. When the tray member and fold-down door move from the collapsed position to the expanded position then the holder unit goes from the collapsed state to the expanded state.

DETAILED DESCRIPTION OF PREFERRED EMBODIMENTS

Figure 1:
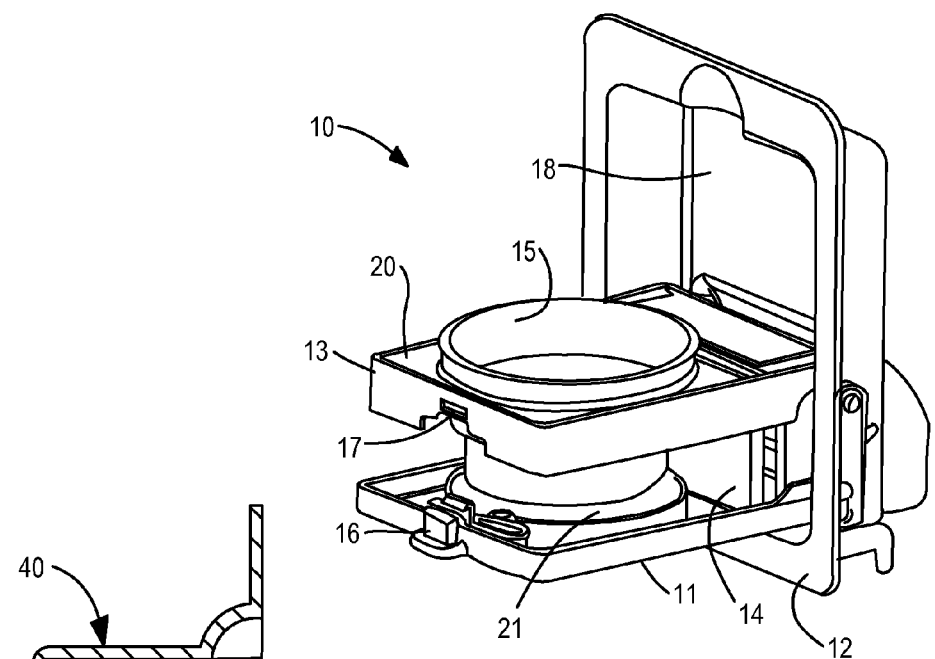
FIG. 1 is a perspective view of a cup holder in an open position and in an expanded state for receiving a beverage container.
Figure 3:
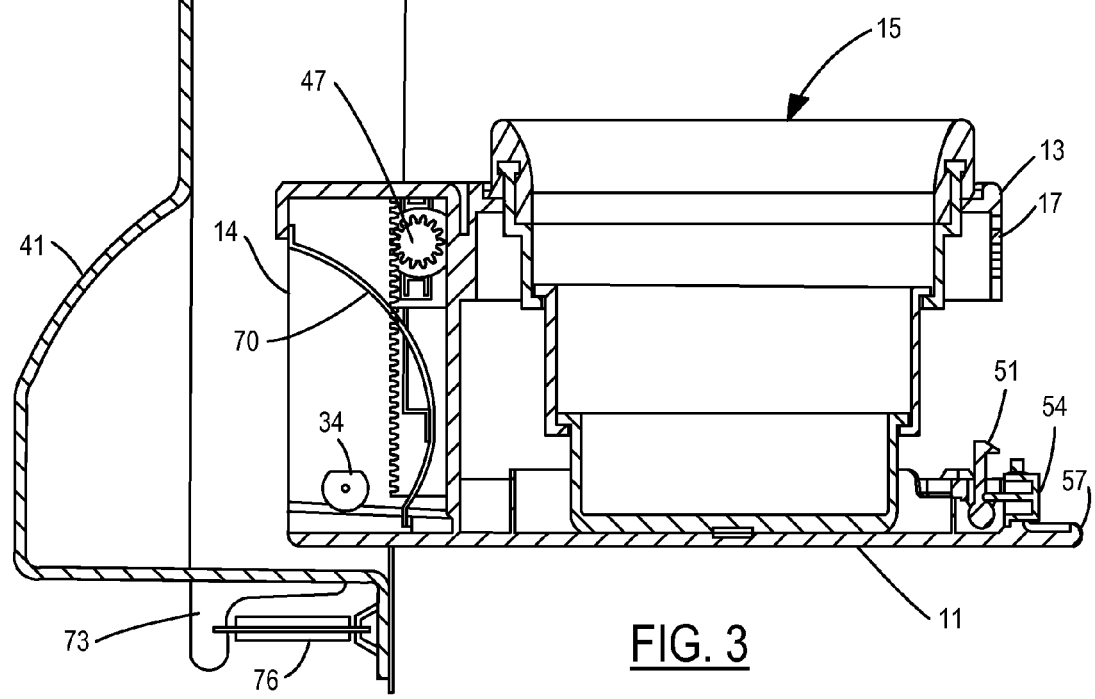
FIG. 3 is a side cross-sectional view of the cup holder of FIG. 1.

Referring now to FIG. 1, a first embodiment of a telescoping cup holder 10 includes a substantially planar fold-down door 11 which is pivotable outwardly and downwardly from a vertical panel 12. Door 11 has a pivot axis adjacent a bottom edge so that it moves between a substantially vertical closed position that covers a recess 18 and a substantially horizontal open position as shown in FIG. 1. A substantially planar tray member 13 extends parallel to door 11 and is slideably mounted to a guide frame 14. Guide frame 14 extends from an inside surface of door 11 adjacent the bottom edge. Tray member 13 is movable between a collapsed position and an expanded position at respective distances from the inside surface of door 11. The expanded position is shown in FIG. 1.

Tray member 13 has a central aperture for receiving a holder unit 15 which has a top rim 20 coupled to tray member 13 and a bottom plate 21 coupled to door 11. Thus, when tray member 13 and door 11 move from their collapsed position (i.e., in their closest proximity) to the expanded position (i.e., with tray member 13 moving to the distal end of guide frame 14), then holder unit 15 goes from a collapsed state to an expanded state. In the collapsed state, the volume is reduced so that cup holder 10 may be pivoted upward into recess 18. In the expanded state, holder unit 15 accommodates a wide range of beverage container sizes.

Figure 2:
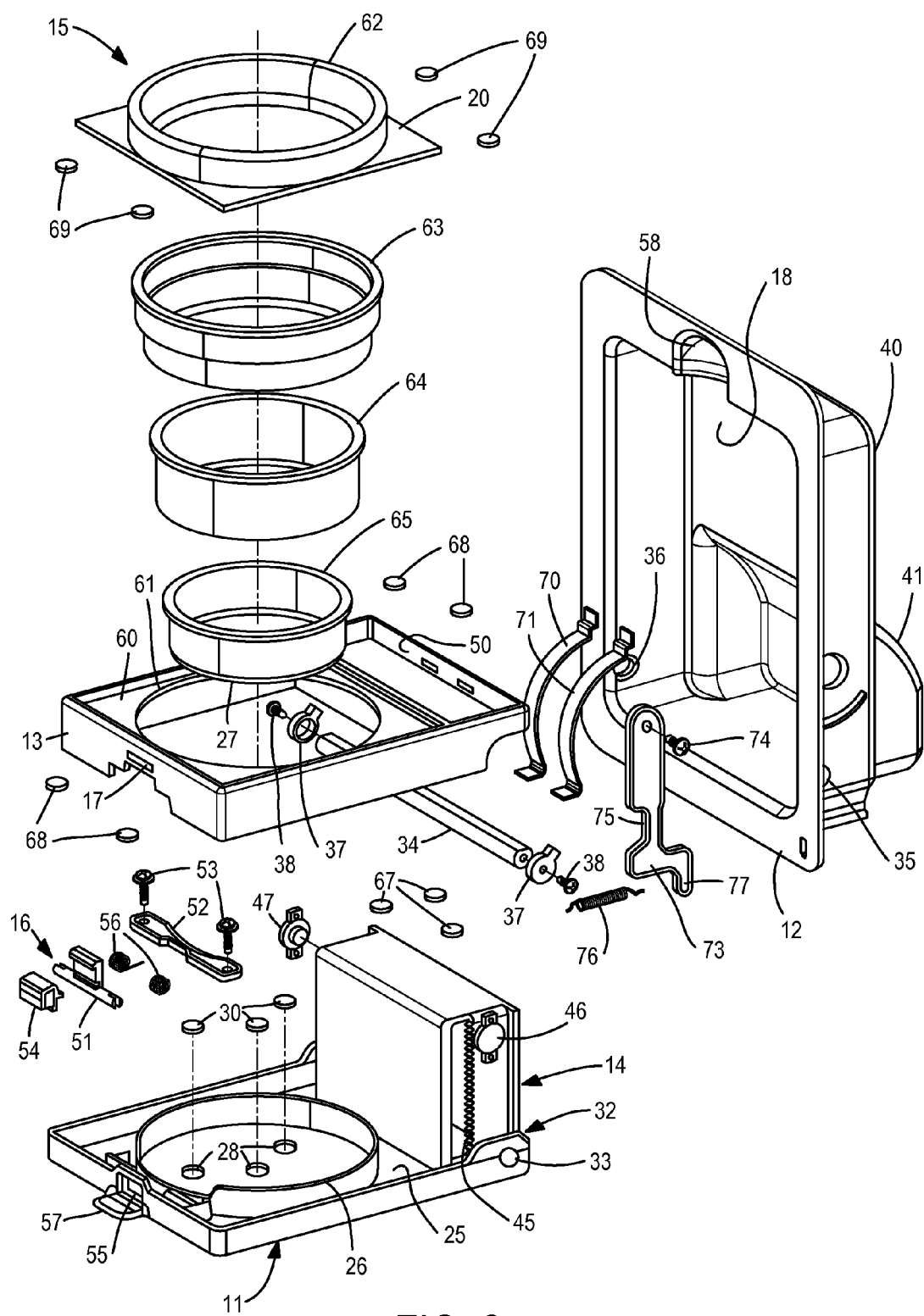
FIG. 2 is an exploded view of the cup holder of FIG. 1.

Cup holder 10 is shown in greater detail in the exploded view of FIG. 2. Fold-down door 11 has an inside surface 25 with a raised wall 26 arranged to receive a bottom plate 27 of holder unit 15. Recesses 28 receive respective magnets 30 that are used to releasably hold bottom plate 27 as described below. Magnets 30 may be mounted into recesses 28 by gluing, for example.

Door 11 has a bottom edge 32 and a longitudinal passage 33 along its pivot axis. A pivot shaft 34 is received in passage 33 to act as a pivot pin which is anchored to a pair of aligned holes 35 and 36 in recess 18 of panel 12. Caps 37 and fasteners 38 are attached to shaft 34 from the outside of panel 12 in order to retain shaft 34 and to align door 11 so that when pivoted into the closed position an outside trim surface of door 11 opposite from inside surface 25 is substantially flush with the vertical trim surface of panel 12. In a preferred embodiment, panel 12 may be comprised of a cubby unit 40 for attaching the cup holder into an aperture of a larger vertical panel such as a vehicle door trim panel or a wall. Cubby 40 may include an extension 41 providing a slightly greater depth at the lower end of recess 18 to accommodate guide frame 14 when the cup holder is in the closed position.

Guide frame 14 extends along bottom edge 32 of door 11 and has a toothed track 45 for receiving a damping gear 46. Another toothed track (not shown) is aligned on the opposite side of guide frame 14 to receive a corresponding damping gear 47. Damping gears 46 and 47 are retained the tracks in order to provide damped motion of tray member 13 between the end positions at opposite ends of the tracks. Tray member 13 has an open collar 50 along its bottom edge which is sized to receive guide frame 14. Damping gears 46 and 47 are fastened to collar 50, thereby providing the collapsible/expandable sliding movement between tray member 13 and door 11.

To lock tray member into the collapsed position closest to door 11, latch 16 selectably engages slot 17. A beam 51 is mounted to inside surface 25 by a retainer bar 52 and fasteners 53. Beam 51 is flexible or pivotable in order to selectably engage slot 17. A button 54 is received in an opening 55 in door 11 to selectably engage beam 51 to force it out of slot 17 to release tray member 13 when button 54 is manually pressed. Coil springs 56 are mounted between button 54/beam 51 and door 11 in order to urge beam 51 and button 54 into the locked position. A pull tab 57 nests into a groove 58 in panel 12 to provide easy opening of the cup holder from its closed position.

Tray member 13 has a shelf 60 with a central aperture 61 that receives holder unit 15. Holder unit 15 is comprised of a plurality of substantially cylindrical sleeve elements 62-65 each with a different diameter and concentrically arranged to slide from the collapsed state to the expanded state. Upper most sleeve element 62 includes top rim 20 for coupling with shelf 60. Rim 20 has corners that extend beyond the diameter of central aperture 61. Sleeve element 63 fits within sleeve element 62 while sleeve element 65 fits nests within sleeve element 63 and sleeve element 65 nests within sleeve element 64. Bottom plate 27 may be comprised of the cup-like bottom of sleeve element 65 or it may be comprised a separate plate or disc (not shown) that is larger than the inside diameter of uppermost sleeve 62. Sleeve elements 63-65 include outward directed flanges at their top edges and inward directed flanges at their lower edges to keep them from fully separating when going to the expanded state. The purpose of an enlarged bottom plate would be to prevent sleeve elements from being lifted through the top of the sleeve elements above it. This separate, however, can be prevented by the coupling of lowermost sleeve element 65 to door 11 via magnets 30. Corresponding magnetizable discs 67 are fixed to bottom plate 27 thereby keeping all sleeve elements in place.

Top rim 20 may also be releasably coupled to shelf 60 magnetically. Thus, magnet discs 68 are fixed to respective corners of shelf 60 and magnetizeable discs 69 affixed to corresponding corners of top rim 20.

To assist with the movement of tray member 13 from the collapsed position to the expanded position after a user presses button 54 to unlatch tray member 13, a pair of leaf springs 70 and 71 are provided within guide frame 14 such that they act tray member 13 via damping gears 46 and 47. By urging gears 46 and 47 away from door 11, tray member 13 automatically springs vertically upward after being released. In order to stow the cup holder, the user presses down on tray member 13 against leaf springs 70 and 71 until latch 16 re-engages slot 17. Then, the cup holder may be pivoted back to its closed position. Instead of manually collapsing tray member 13, an appropriate cam surface could alternatively be provided inside cubby 40 for engaging tray member 13 to collapse it in response to the force of closing door 11.

A lever 73 is connected by a screw 74 at one side of recess 18 and has a notch 75 sized to receive bottom edge 32 of door 11. A spring 76 is joined between an end 77 of lever 73 and a back surface of panel 12. Lever 73 is rotatable in response to force imparted by door 11, whereby notch 75 acts as a detent for helping retain door 11 in its open position.

Figure 4:
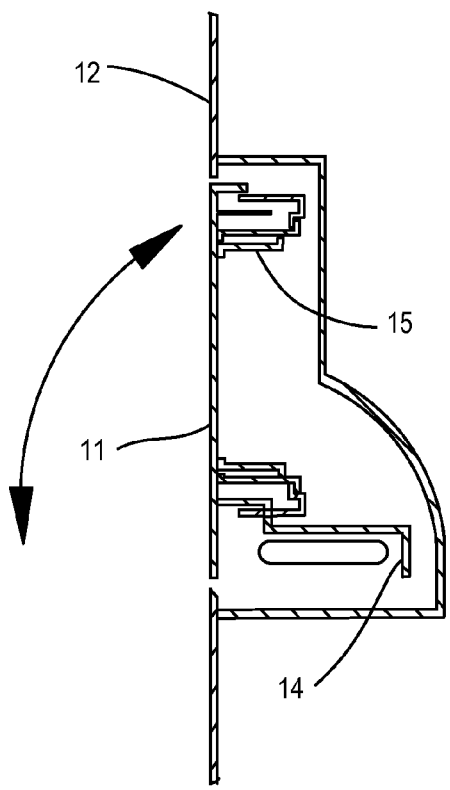
FIGS. 4-6 are cross-sectional views of a simplified representation of the cup holder in a closed position, open/collapsed position, and open/expanded position, respectively.
Figure 5:
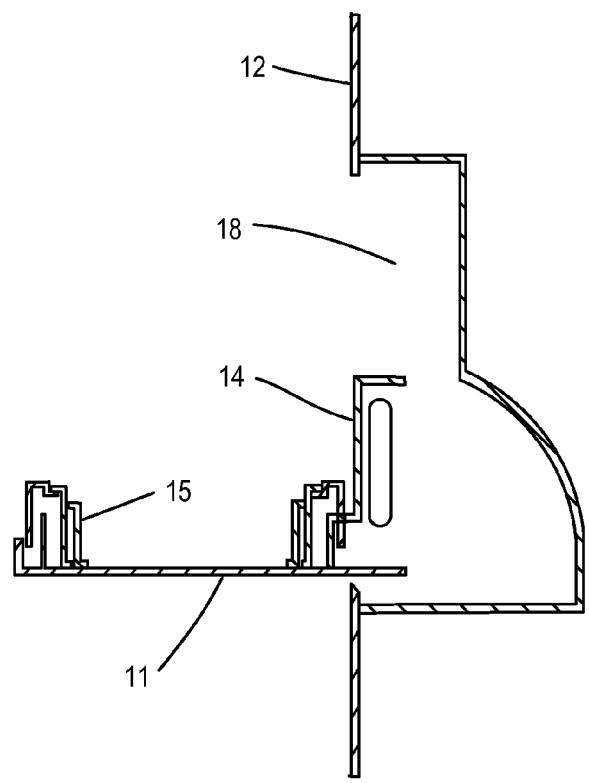
Figure 6:
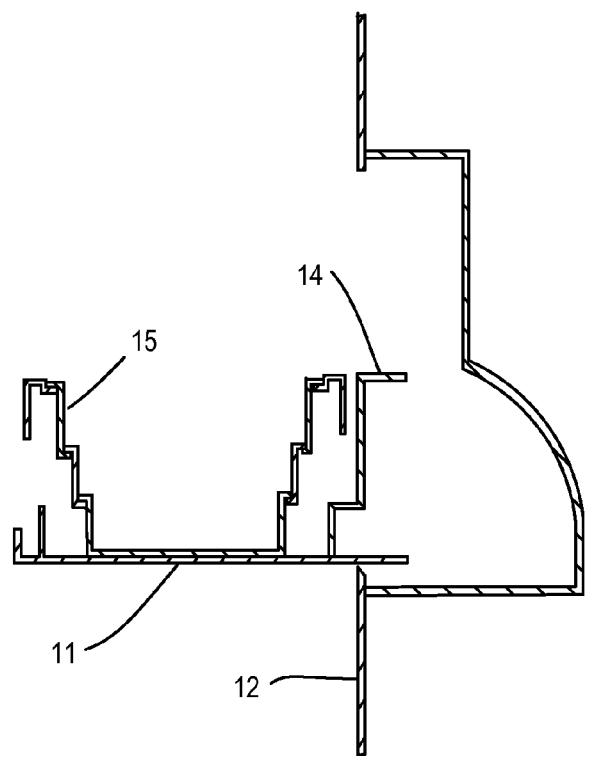

FIGS. 4-6 illustrate the various movements of the cup holder. In FIG. 4, door 11 is closed and holder unit 15 is collapsed. In FIG. 5, door 11 has been pivoted downwardly and outwardly to its open position and holder unit 15 remains in a collapsed state while latch 16 is engaged. Thus, FIG. 5 shows the condition in which the cup holder can be moved back to the closed position. FIG. 6 shows holder unit 15 in the expanded state to receive a beverage container.

Figure 7:
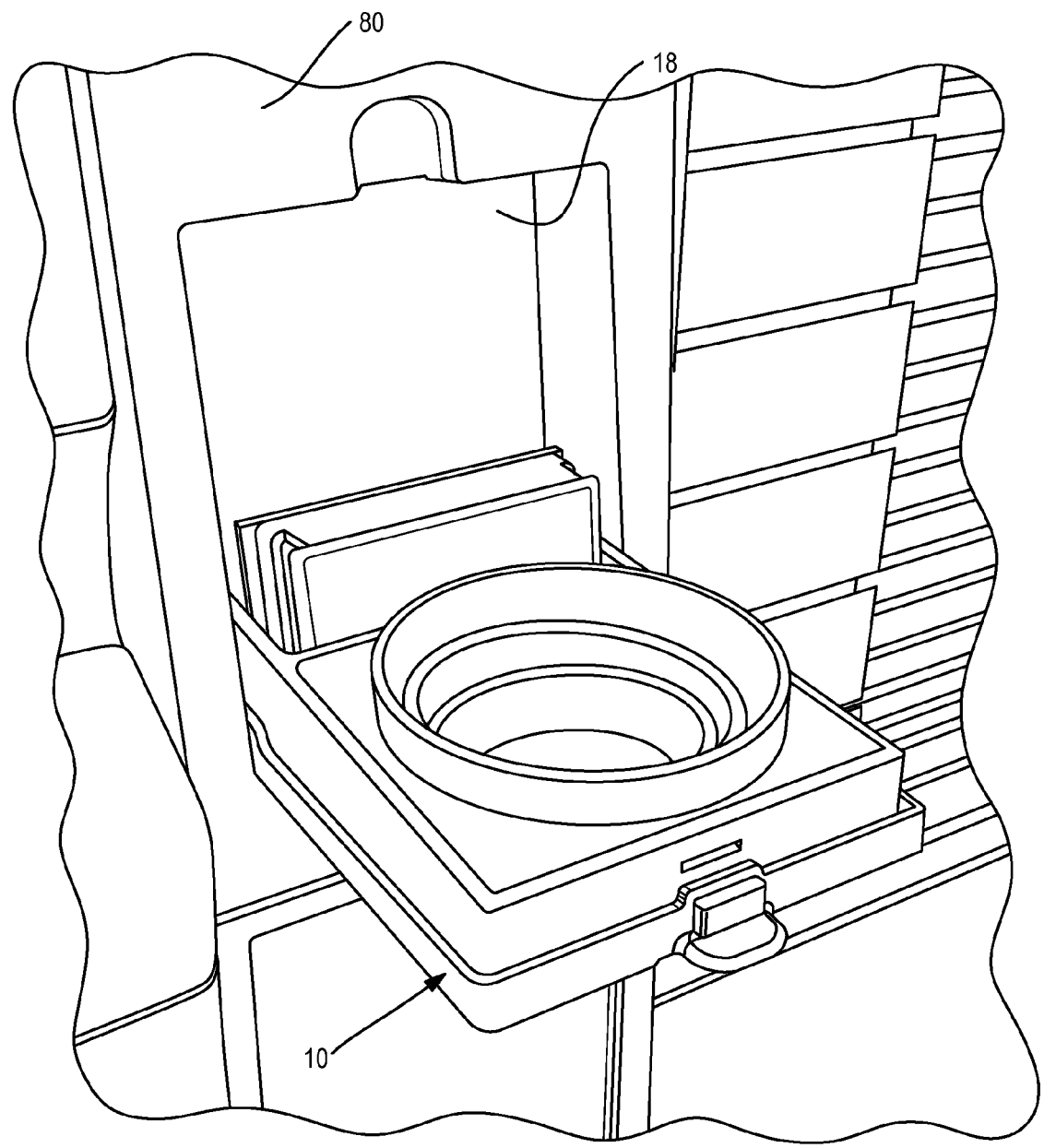
FIG. 7 is a perspective view of a cup holder in the open/collapsed position.

FIG. 7 is a perspective view showing cup holder 10 incorporated into a vertical panel 80 such as a door trim panel for a rear seat door in a motor vehicle. Cup holder 10 can also be mounted to any substantially vertical panel such as the back of a theatre or stadium seat or a wall of any room.

Figure 8:
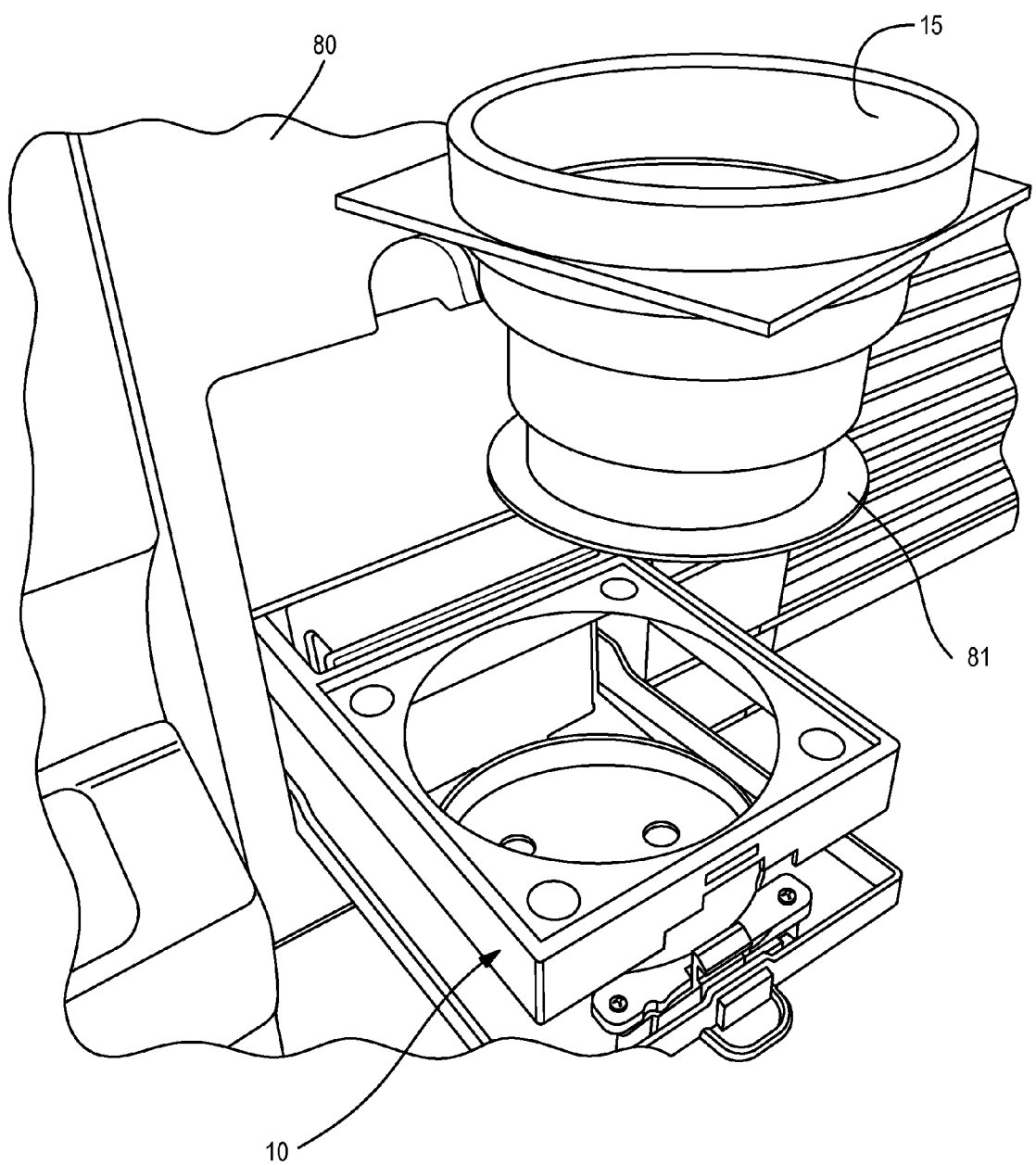
FIG. 8 is a perspective view of a cup holder in the open/expanded position and with a holder unit having been lifted out of the cup holder for cleaning.

FIG. 8 illustrates the removing of holder unit 15 in order to clean or replace it. Bottom plate 81 attached to the lowest sleeve element provides a diameter sufficiently large to prevent it from moving through the uppermost sleeve element. Thus, holder unit 15 remains an integral unit without coming apart while it is removed from the door and tray member.

What is claimed is:

1. A cup holder deployable from a recess in a substantially vertical panel, comprising:

a substantially planar fold-down door pivotable along a pivot axis adjacent to a bottom edge of the fold-down door, wherein the fold-down door has a substantially vertical closed position covering the recess and a substantially horizontal open position, wherein the fold-down door has an outside trim surface opposite from an inside surface;

a guide frame extending from the inside surface of the fold-down door adjacent the bottom edge;

a substantially planar tray member extending substantially parallel to the fold-down door and slidably mounted to the guide frame to move between a collapsed position and an expanded position at respective distances from the inside surface of the fold-down door, wherein the tray member has a central aperture;

a telescoping holder unit comprising a plurality of substantially cylindrical sleeve elements having different diameters and concentrically arranged to slide from a collapsed state to an expanded state, the holder unit having a bottom plate and a top rim, wherein the top rim is fixed with respect to a cylindrical sleeve element having a largest diameter, wherein the top rim is coupled to the tray member with the holder unit disposed within the central aperture, and wherein the bottom plate is coupled to the fold-down door, whereby when the tray member and fold-down door move from the collapsed position to the expanded position then the holder unit goes from the collapsed state to the expanded state; and a damping gear coupled between the tray member and the guide frame.

2. The cup holder of claim 1 further comprising a leaf spring connected to the guide frame and urging the tray member toward the expanded position.

3. The cup holder of claim 1 further comprising a latch for releasably retaining the tray member in the collapsed position.

4. The cup holder of claim 1 further comprising at least one magnet for releasably coupling the bottom plate to the fold-down door.

5. The cup holder of claim 1 further comprising at least one magnet for releasably coupling the top rim to the tray member.

6. The cup holder of claim 1 wherein the guide frame is integrated with the fold-down door.

7. The cup holder of claim 1 further comprising a cubby trim piece defining the recess and configured to fit into an opening in the vertical panel.

8. The cup holder of claim 7 further comprising a pivot shaft extending from the fold-down door, wherein an end of the pivot shaft is attached to the cubby trim piece.

\* \* \* \* \*